US008873861B2

(12) United States Patent
Motoi et al.

(10) Patent No.: US 8,873,861 B2
(45) Date of Patent: *Oct. 28, 2014

(54) VIDEO PROCESSING APPARATUS AND METHOD

(71) Applicant: Kabushiki Kaisha Toshiba, Tokyo (JP)

(72) Inventors: Shigeru Motoi, Kokubunji (JP); Koji Yamamoto, Ome (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 161 days.

This patent is subject to a terminal disclaimer.

(21) Appl. No.: 13/705,399

(22) Filed: Dec. 5, 2012

(65) Prior Publication Data

US 2013/0156321 A1 Jun. 20, 2013

(30) Foreign Application Priority Data

Dec. 16, 2011 (JP) ................. 2011-275865

(51) Int. Cl.
| | |
|---|---|
| G06K 9/46 | (2006.01) |
| H04N 21/845 | (2011.01) |
| H04N 21/8549 | (2011.01) |
| G06K 9/00 | (2006.01) |
| G06T 7/00 | (2006.01) |
| H04N 21/44 | (2011.01) |
| G11B 27/28 | (2006.01) |
| G11B 27/031 | (2006.01) |
| H04N 21/439 | (2011.01) |

(52) U.S. Cl.
CPC .......... *G06T 7/0097* (2013.01); *H04N 21/8456* (2013.01); *H04N 21/8549* (2013.01); *G06K 9/00751* (2013.01); *H04N 21/44008* (2013.01); *G11B 27/28* (2013.01); *G11B 27/031* (2013.01); *H04N 21/4394* (2013.01)
USPC ........... 382/190; 382/173; 382/305; 382/178; 382/232; 382/260; 382/181; 382/195; 382/209

(58) Field of Classification Search
CPC .......... G06K 9/00711; G06K 9/00751; H04N 21/8456; H04N 21/8549; H04N 21/233; H04N 21/2368; H04N 21/44008
USPC ......... 382/190, 173, 305, 178, 232, 260, 181, 382/195, 209
See application file for complete search history.

(56) References Cited

U.S. PATENT DOCUMENTS 6,744,922 B1 * 6/2004 Walker .......................... 382/190
2012/0076357 A1 3/2012 Yamamoto et al.

FOREIGN PATENT DOCUMENTS

JP 2008-312061 12/2008

* cited by examiner

*Primary Examiner* — Mike Rahmjoo
(74) *Attorney, Agent, or Firm* — Finnegan, Henderson, Farabow, Garrett & Dunner, LLP (57) ABSTRACT

In one embodiment, a method is disclosed for performing a video processing. The method can extract one or more common video segments. The method can select a common summarization segment based on a first summarization score. The method can extract one or more individual video segments in which the number of segments included therein is not more than a third threshold value that is less than a second threshold value. The method can select an individual summarization segment based on a second summarization score. In addition, the method can integrate the common summarization segment and the individual summarization segment to create the summary video.

18 Claims, 7 Drawing Sheets

VIDEO PROCESSING APPARATUS AND METHOD

CROSS-REFERENCE TO RELATED APPLICATIONS

This application is based upon and claims the benefit of priority from Japanese Patent Application No. 2011-275865, filed Dec. 16, 2011, the entire contents of which are incorporated herein by reference.

FIELD

Embodiments described herein relate generally to a video processing apparatus and method.

BACKGROUND

At an event where a large number of people are gathered, such as a wedding or school sports day, it is usual for many amateur videographers (for example, father, mother and so on) to shoot videos of the event. However, such amateur videos may include unnecessary scenes or botched shots; and unless the videos are edited, they will be boring and time-consuming to watch.

A technique allowing key segments of a video to be automatically extracted to produce a condensed version of the video and effectively viewing video images captured by a plurality of imaging devices currently exists.

DETAILED DESCRIPTION

Generally, with the aforementioned conventional technique, since a summary video is created based on the video segments associated by the captured time that are considered as important, the summary video merely includes important scenes in an event such as scenes of speeches and cutting the cake at a wedding ceremony. As a result, the summary video does not include personal scenes unrelated to the important scenes such as friends sitting at a table, and the summary video lacks variety.

In one embodiment, a method for performing a video processing is disclosed. The method can acquire a plurality of video streams each including moving picture data item and sound data item. The method can extract one or more feature values indicating a common feature between the video streams and changing in time series, by analyzing at least one of the moving picture data item and the sound data item for each video stream. The method can generate a plurality of segments by dividing each of the video streams in accordance with changes in the one or more feature values, and generate associated segment groups by comparing the first feature values for each of the segments to obtain similarities and associating a plurality of segments in different video streams such that the segments included in each of the associated segment groups have a similarity not less than a first threshold value. The method can extract, from the associated segment groups, one or more common video segments in which the number of segments included therein is not less than a second threshold value. The method can calculate a first summarization score indicating a degree of suitability for including the one or more common video segments in a summary video, the first summarization score is defined for each common video segment and varying with time and being based on the one or more feature values. The method can select a common summarization segment to be used for the summary video from the common video segments based on the first summarization score. The method can extract, from the associated segment groups, one or more individual video segments in which the number of segments included therein is not more than a third threshold value that is less than the second threshold value. The method can calculate a second summarization score indicating a degree of suitability for including the one or more individual video segments in the summary video, the second summarization score being defined for each individual video segment and varying with time and being based on the one or more feature values. The method can select an individual summarization segment to be used for the summary video from the individual video segments based on the second summarization score. In addition, the method can integrate the common summarization segment and the individual summarization segment to create the summary video.

In the following, the video processing apparatus and method according to the present embodiments will be described in details with reference to the drawings. In the embodiments described below, elements specified by the same reference number carry out the same operation, and a duplicate description of such elements will be omitted.

First Embodiment

Figure 1:
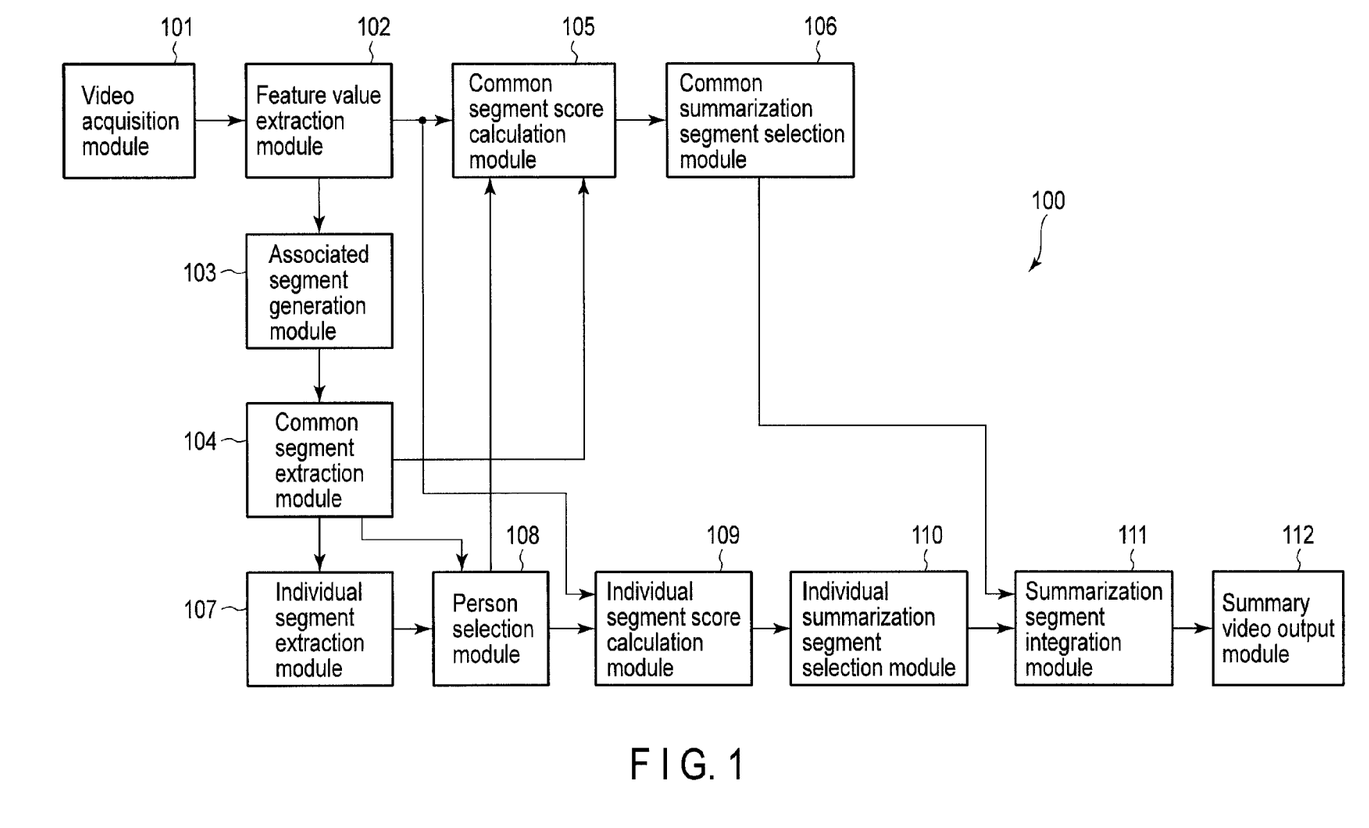
FIG. 1 is a block diagram illustrating a video processing apparatus according to the first embodiment.

A description of the video processing apparatus according to the first embodiment with reference to FIG. 1 follows.

A video processing apparatus 100 according to this embodiment includes a video acquisition module 101, a feature value extraction module 102 (first extraction module), an associated segment generation module 103, a common segment extraction module 104 (second extraction module), a common segment score calculation module 105, a common summarization segment selection module 106 (first selection module), an individual segment extraction module 107 (third extraction module), a person selection module 108 (third selection module), an individual segment score calculation module 109, an individual summarization segment selection module 110 (second selection module), a summarization segment integration module 111 and a summary video output module 112.

The video acquisition module 101 receives from external devices a plurality of video streams. Each of the video streams includes image data item and sound data item.

The feature value extraction module 102 receives a plurality of video streams from the video acquisition module 101 and extracts the feature value for each predetermined time period of each video stream. The feature value represents a feature of the video stream and indicates a common feature in a plurality of video streams. Each feature value quantifies an image feature or a sound feature of the stream. The image feature indicates a value of characteristics of video stream that is extracted from image data item. The sound feature indicates a value of characteristics of video stream that is extracted from sound data item. The feature value may be extracted at predetermined time intervals or every predetermined numbers of frames. The feature values to be extracted may be either the image feature or the sound feature, and may be both the image feature and the sound feature.

For encoded streams, for example, a Moving Picture Experts Group (MPEG) stream, only I-pictures may be used in extracting feature values, not P-picture or B-picture, where an I-picture is an intra-frame prediction scheme, and P-picture and B-picture are an inter-frame prediction scheme. This allows faster processing because only I-frames need be decoded, whereas with P- or B-pictures, not only would P- or B-frames have to be decoded, but also associated frames.

An image feature can be a low-level feature, such as color or luminance, which does not require picture analysis; a medium-level feature, such as an edge, frequency component, motion vector or local feature, obtained by relatively simple analysis; or a high-level feature, such as facial data obtained by face detection, involving a combination of several kinds of analysis. An image feature may also be a statistic such as a color histogram.

Similarly, a sound feature can be a low-level feature such as volume or a frequency component, or a high-level feature obtained by combining various recognition techniques. High-level features include data such as text data obtained by speech recognition, sound types such as human voice and music, and speaker identification and classification results.

If the input video stream is in an encoded format such as MPEG, the encoded data may be used. If the encoded data represents image data item, DC component information, motion vector information, and code length can be feature values; if the encoded data represents audio data item, the feature values can be extracted without decoding the frequency data or the like.

The associated segments generation module 103 receives the feature values from the feature value extraction module 102, and divides each video stream into a plurality of segments at points where the feature values extracted for each period change considerably. Then, the associated segments generation module 103 compares the feature values of the segments of different video streams and calculates similarities. If the segments have a similarity greater than or equal to a threshold value, they are associated with one another as an associated segment group.

The common segment extraction module 104 receives the associated segment groups from the associated segment generation module 103. If the number of segments in an associated segment group is greater than or equal to a first threshold value, the associated segment group is extracted as a common video segment.

The common segment score calculation module 105 receives the feature values from the feature value extraction module 102 and common video segments from the common segment extraction module 104, and calculates a common summarization score for each of the common video segments based on the feature values included therein. The common summarization score indicates how the segment is suitable to be included in a summary video. The summarization scores are calculated by using, for example, the size or number of faces in a scene, the degree of a smile, or sharpness. The common segment score calculation module 105 receives information regarding a summarization object that is a main object of the summary video from the person selection module 108 described later. The common summarization score of the video including the summarization object may be weighted to be high. In this embodiment, the summarization object is a main person in the summary video, but may be an animal, a facility or a landscape that is mainly captured in each video stream.

The common summarization segment selection module 106 receives the common video segments and the corresponding common summarization scores from the common segment score calculation module 105, and selects common summarization segments to be included in the summary video from the common video segments based on the common summarization scores.

The individual segment extraction module 107 receives the associated segment groups from the common segment extraction module 104. If the number of segments in an associated segment group is less than or equal to a second threshold value, the associated segment group is extracted as an individual video segment. If the second threshold value is zero, an associated segment group which includes two or more segments is extracted as a common video segment, and the other associated segment groups are extracted as individual video segments.

The person selection module 108 receives the common video segments from the common segment extraction module 104 and the individual video segments from the individual segment extraction module 107, and selects a summarization object for each segment.

The individual segment score calculation module 109 receives data regarding the individual video segments and the summarization object from the person selection module 108, and calculates the feature values of each of the individual video segments in the same manner as for the common segment score calculation module 105. The individual summarization score of the individual video segment including the summarization object may be weighted to be high.

The individual summarization segment selection module 110 receives the individual video segments and the corresponding individual summarization scores from the individual segment score calculation module 109, and selects individual summarization segments to be included in the summary video based on the individual summarization scores.

The summarization segment integration module 111 receives the common summarization segments from the common summarization segment selection module 106 and the individual summarization segments from the individual summarization segment selection module 110, and creates the summary video by combining the common summarization segments and the individual summarization segments.

The summary video output module 112 receives the summary video from the summarization segment integration module 111 and outputs the summary video to an external device. The summary video output module 112 may receive and output the video streams and data specifying segments corresponding to the summary video instead of the summary video.

Figure 2:
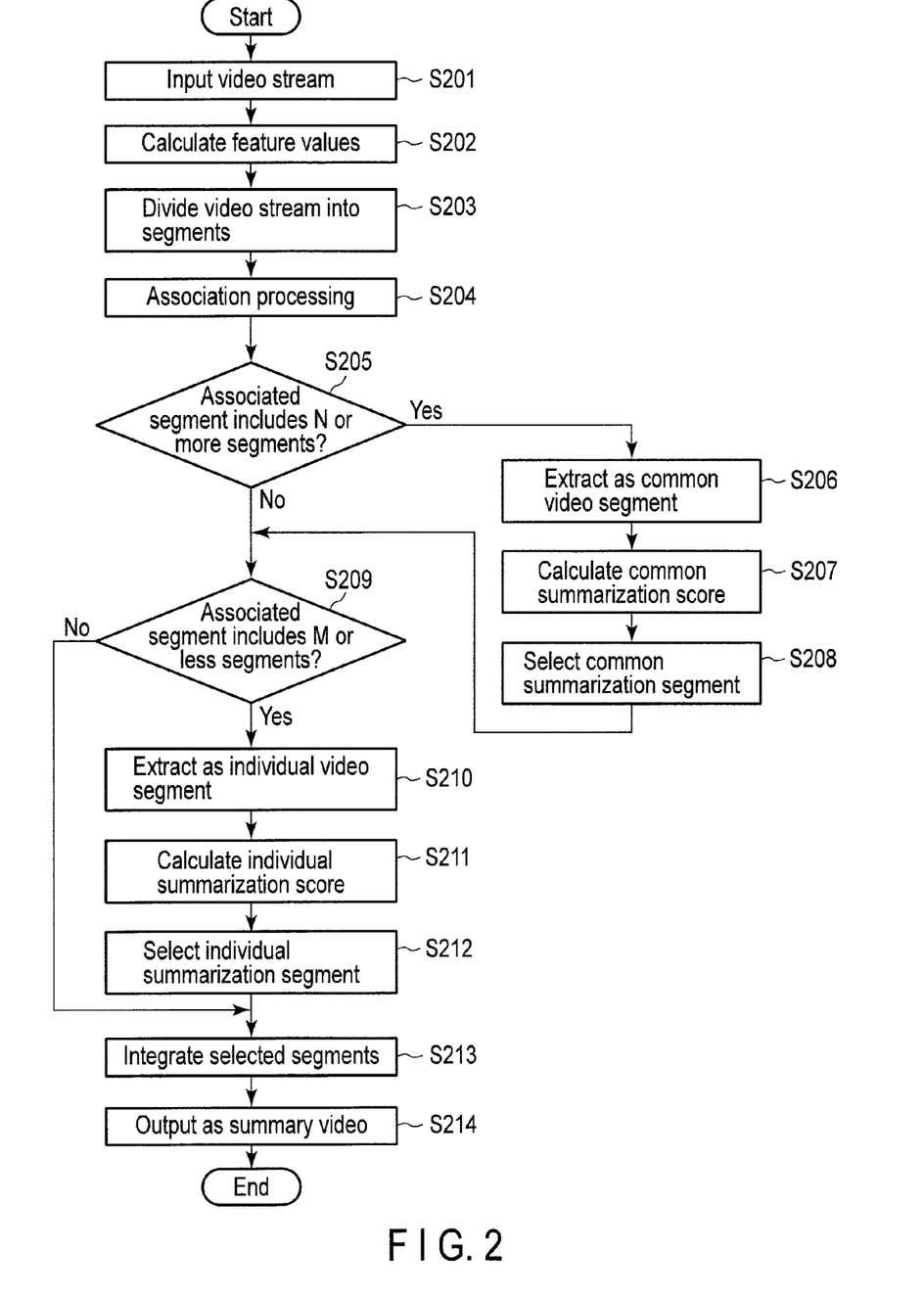
FIG. 2 is an exemplary flowchart illustrating the operation of the video processing apparatus.

The operation of the video processing apparatus 100 according to this embodiment will be explained with reference to the flowchart shown in FIG. 2.

In step S201, the acquisition module 101 receives a plurality of video streams from external devices.

In step S202, the feature values extraction module 102 extracts the feature values of video streams in accordance with a predetermined period.

In step S203, the associated segments generation module 103 divides each video stream into a plurality of segments at points where the feature value extracted for each predetermined period changes considerably. For example, a distance is measured by comparing color histogram for each frame, and video stream is divided between frames at which the difference in distance is large. The distance is obtained by calculating the absolute value of the frequency difference for each bin of histogram and adding all absolute values.

In step S204, the associated segments generation module 103 calculates similarities by comparing the feature values of the plurality of segments. The feature values of segments are represented, for example, by the mean value or parameters of models created based on distribution, of feature values obtained at different time within a segment. Sequentially, the associated segments generation module 103 generates associated segment groups by associating segments of different video streams whose similarities are greater than or equal to a threshold value.

In step S205, the common segment extraction module 104 determines whether or not the number of segments in an associated segment group is N or more (N is a natural number greater than or equal to 2). If the number of segments is N or more, step S206 is executed, and if the number of segments is less than N, step S209 is executed.

In step S206, an associated segment group which includes N segments or more is extracted as a common video segment since such a segment group is inferred as including important scenes of an event.

In step S207, the common segment score calculation module 105 calculates a common summarization score for each common video segment by using the feature value.

In step S208, the common summarization segment selection module 106 selects a common video segment whose common summarization score is greater than or equal to a threshold value as a common summarization segment.

In step S209, the individual segment extraction module 107 determines whether or not the number of segments in an associated segment group is less than or equal to M (M is an integer, where 0≤M<N). If the number of segments is less than or equal to M, step S210 is executed, and if the number of segments is greater than M, step S213 is executed.

In step S210, the individual segment extraction module 107 extracts an associated segment group having M or less segments as an individual video segment.

In step S211, the individual segment score calculation module 109 calculates an individual summarization score for each individual video segment by using the feature value.

In step S212, the individual summarization segment selection module 110 selects an individual video segment whose individual summarization score is greater than or equal to a threshold value as an individual summarization segment.

In step S213, the summarization segment integration module 111 creates a summary video by integrating the common summarization segments and the individual summarization segments.

In step S214, the summary video output module 112 outputs the summary video to an external device. The operation of the video processing apparatus 100 in the present embodiment is completed in this step.

Figure 3:
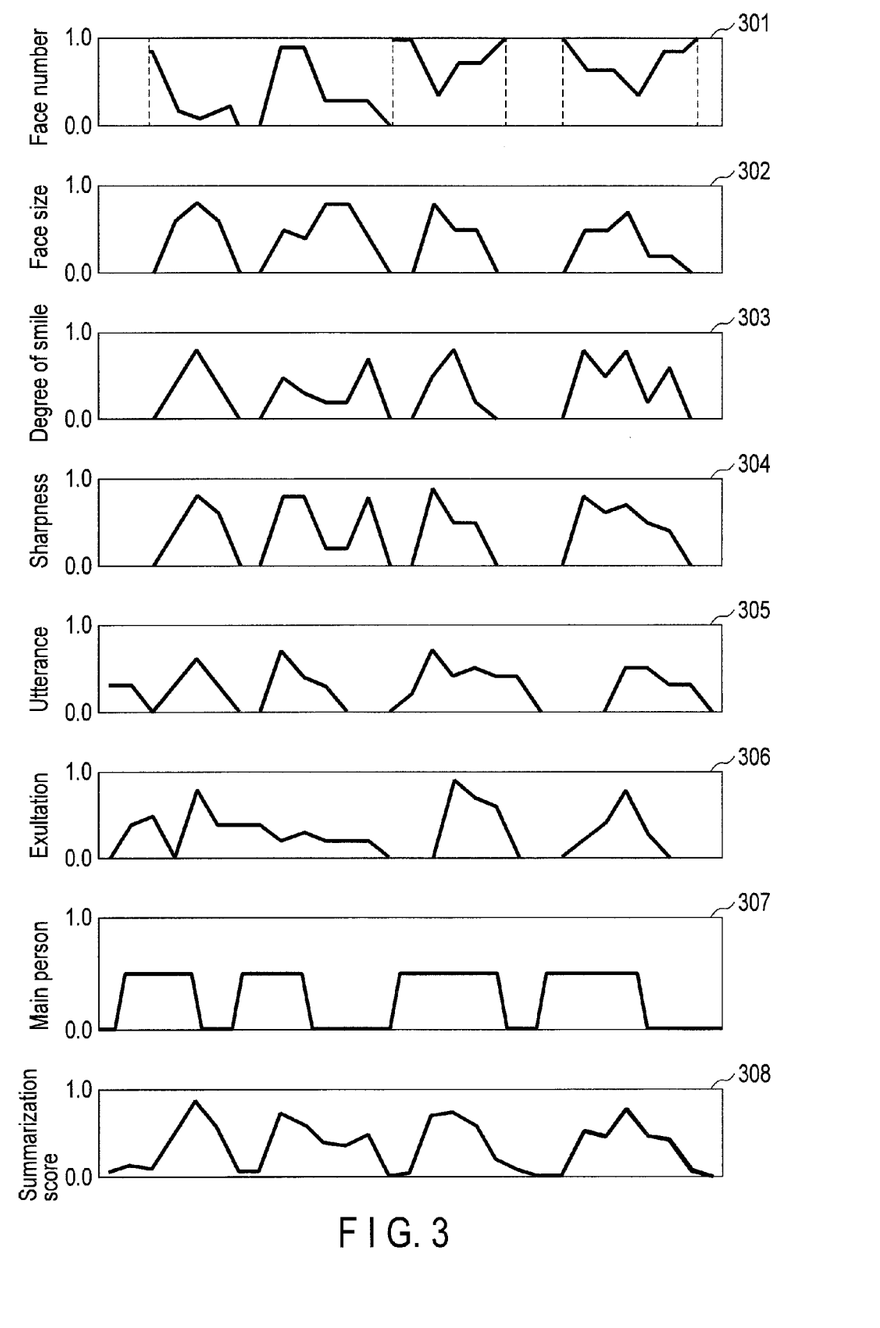
FIG. 3 illustrates an example of the calculation method of the individual summarization score and the common summarization score.

Examples of calculation methods of a common summarization score at the common segment score calculation module 105 and an individual summarization score at the individual segment score calculation module 109 are given with reference to FIG. 3.

FIG. 3 indicates changes of scores of feature elements extracted from video streams with time. Concretely, the scores of feature elements such as the number of faces 301, the size of face 302, the degree of a smile 303, sharpness 304, utterance 305, cheering 306 and main person 307 are calculated.

The summarization score 308 is a value obtained by adding the scores of all elements and normalizing the added score. When adding the scores, the scores can be weighted in accordance with the importance of an element. For example, if a specific person is important in an event, the scores of main person 307, size of face 302 and utterance 305 are weighted to be high scores, and the score of cheering 306 is weighted to be low.

In this example, the summarization scores are calculated from a plurality of elements. However, the summarization scores may be calculated from one element if the score varies over time. The number of elements used for summarization score calculation may be reduced for calculation cost reduction. The change of score may be based on the frames of video, for example, the numbers added to video (frame numbers).

The processing in the common segment score calculation module 105, the person selection module 108 and the individual segment score calculation module 109 will be explained with reference to FIG. 4.

Figure 4:
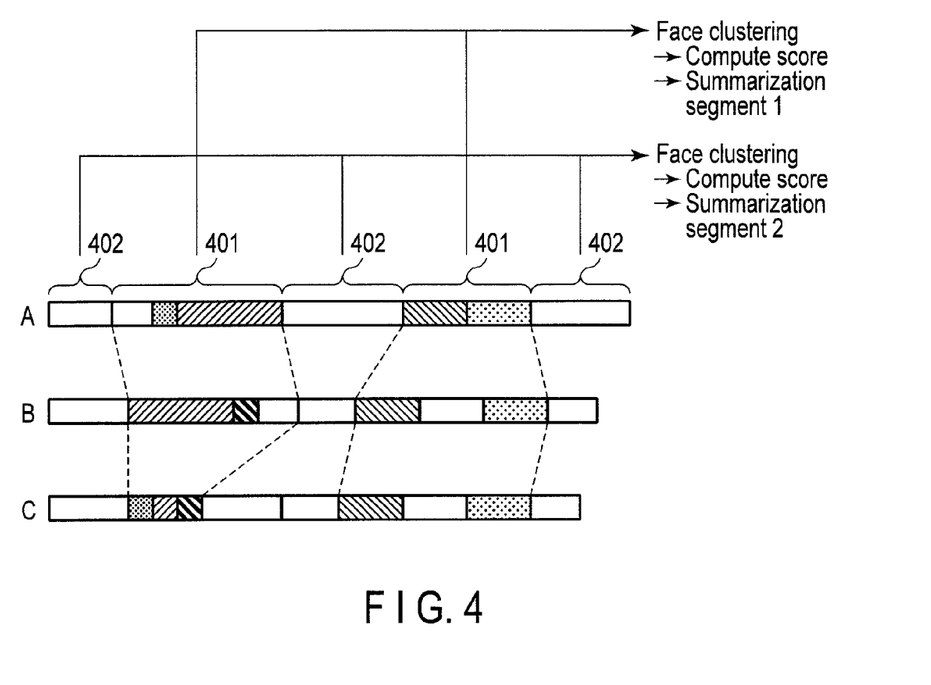
FIG. 4 is an exemplary conceptual diagram illustrating the selection method of summarization objects in the common video segments and the individual video segments.

FIG. 4 shows video streams each captured by users A, B and C. The associated segments for each video stream are indicated with the same shading pattern. In FIG. 4, it is assumed that common video segments 401 and individual video segments 402 have been already extracted.

The person selection module 108 classifies people by clustering the feature values of faces obtained by face detection for each video stream. The person selection module 108 then selects a person whose cluster element number is greater than or equal to a threshold value as a summarization object. The common segment score calculation module 105 and the individual segment score calculation module 109 each weight the scores of segment groups including the summarization object to be high in the common summarization segments and individual summarization segments, and calculate common summarization scores and individual summarization scores.

For example, it is assumed that a bride and groom are summarization objects in a wedding ceremony. For this event, the common summarization scores and the individual summarization scores of segments including the bride and groom are weighted to be high. Instead of face clustering, speaker clustering based on sound features may be used for classifying people. For the speaker clustering, the mel frequency cepstral coefficient (MFCC) may be used for extracting sound features from frequency components.

As stated above, for the video stream in which a summarization object appears many times, it is possible to include an individual video segment related to the main person of the event by setting the score of a segment including the summarization object to be high when calculating an individual summarization score. This realizes the creation of a summary video having great variety within the summarization theme.

If the cluster element numbers for all people obtained by the face clustering or speaker clustering are less than a predetermined threshold value, it is assumed that there is no summarization object in the entire video streams. In this case, the face clustering or speaker clustering is performed for each common video segment 401 and individual video segment 402. If a person whose cluster element number is greater than the threshold value exists in a segment, the common summarization score or the individual summarization score of the segment is weighted to be high.

For example, in a seminar or a congress having multiple instructors or speakers, it is assumed that scenes of multiple sessions are extracted as common video segments. However, it is assumed that there is no person selected as a summarization object throughout the common video segments. In this case, the summarization object is calculated for each common video segment, and the scores of segments including each instructor or speaker are weighted to be high, so that all instructors or speakers can be included in a summary video.

The individual segment score calculation module 109 may compare the feature values of common video segments with the feature values of the individual video segments, and weight the summarization scores of individual video segments to be high depending on the difference. As the difference between the feature values becomes greater, the summarization scores are weighted to be higher. In this case, the individual segment score calculation module 109 receives the common video segments and the individual video segments from the person selection module 108, and receives the corresponding feature values from the feature value extraction module 102. Then, the individual segment score calculation module 109 calculates the similarities between the motion vectors that represent video features of the common video segments and the individual video segments. The individual segment score calculation module 109 weights the scores of the individual video segments having a similarity lower than a threshold value to be high.

When a large number of common video segments and individual video segments exist, and it takes time to calculate the summarization scores, of histograms of colors or edge components may be compared to obtain the similarities at high speed. The similarities can be calculated in the same manner as for the case where the feature value indicates sound feature.

Further, when the feature values of individual video segments are compared, the individual segment score calculation module 109 may weight the summarization scores to be high depending on the difference in the same manner as for the case where the similarities of the feature values between the common video segments and the individual video segments are calculated. The segments having a higher difference may be weighted to be higher.

As the number of segments in an associated segment groups set as an individual video segment becomes lower, the individual segment score calculation module 109 may weight the summarization score of the individual video segment to be higher. This increases the selection variety of video segments as individual summarization segments.

Next, selection of a common summarization segment by the common summarization segment selection module 106 will be explained with reference to FIG. 5.

Figure 5:
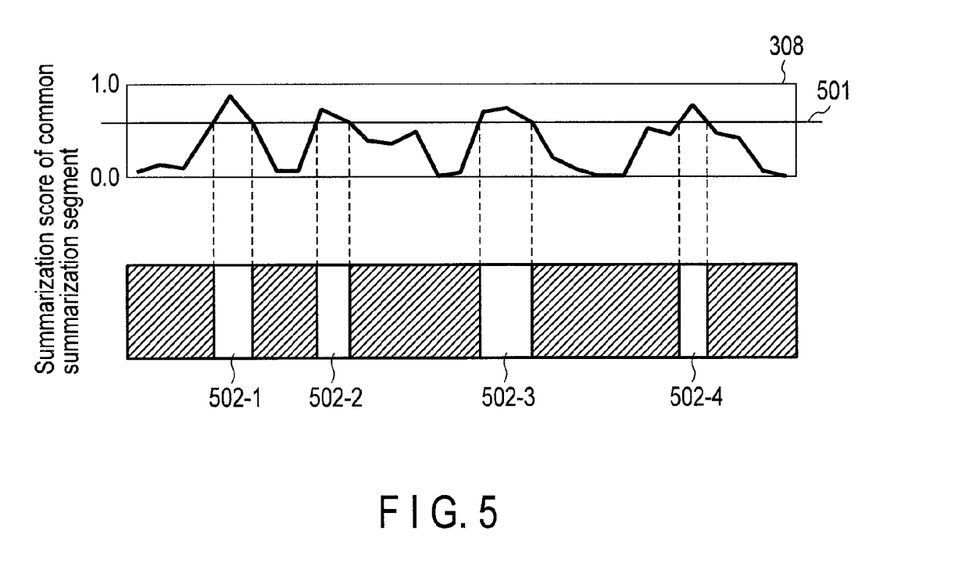
FIG. 5 illustrates an example of the selection method of common summarization segments.

FIG. 5 shows a case where a common summarization segment is selected based on the summarization score 308 shown in FIG. 3. As shown in FIG. 5, the common summarization segment selection module 106 selects segments 502-1 to 502-4 in which the total summarization score is greater than or equal to a threshold value 501 as common summarization segments. The threshold value 501 can be preset, or can be set to be a total number of summarization segments or a total time of summarization segments. For example, if the threshold value 501 is the total time of summarization segments and is 15 minutes, segments may be selected so that the sum of the segments does not exceed 15 minutes.

Selection of an individual summarization segment by the individual summarization segment selection module 110 will be explained with reference to FIG. 6.

Figure 6:
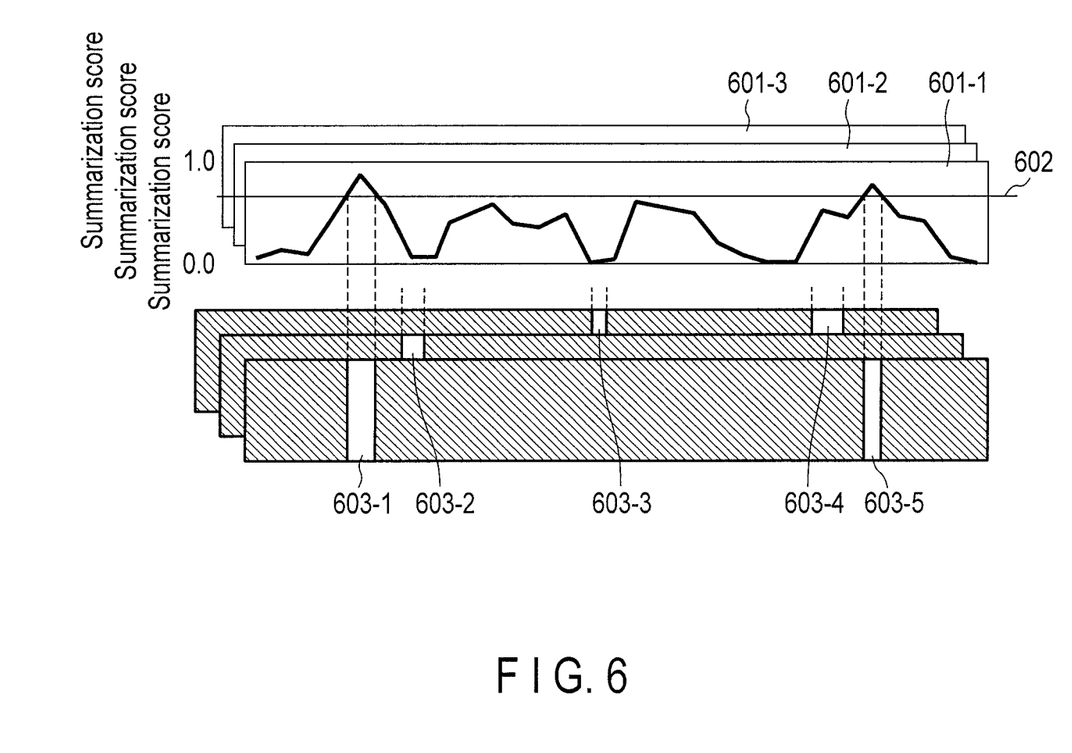
FIG. 6 illustrates an example of the selection method of individual summarization segments.

FIG. 6 shows summarization scores 601-1, 601-2 and 601-3 of video streams captured by users A, B and C, respectively. The individual summarization segment selection module 110 selects segments 603-1 to 603-5 in which the summarization scores are greater than or equal to a threshold value 602 as individual summarization segments, in the same manner as the common summarization segment selection module 106. The threshold value 602 can be the same as or different from the threshold value 501.

In addition, the threshold value 602 can vary for each user. This realizes creation of a summary video including individual video segments in which various desired people other than the summarization object appear. For example, for the wedding ceremony, the threshold value for the video streams captured by relatives of the bride and groom may be set to be low, and the threshold value for the video streams captured by friends may be set to be high. In this case, a large number of segments are selected as individual summarization segments from the video streams in which the threshold values of the summarization scores are low, and a smaller number of segments are selected from video streams in which the threshold values are high. As a result, the summary video includes a large number of individual summarization segments in which the relatives appear, and a summary video desirable for the relatives can be created.

The integration processing of the summarization segment integration module 111 will be explained with reference to FIG. 7.

Figure 7:
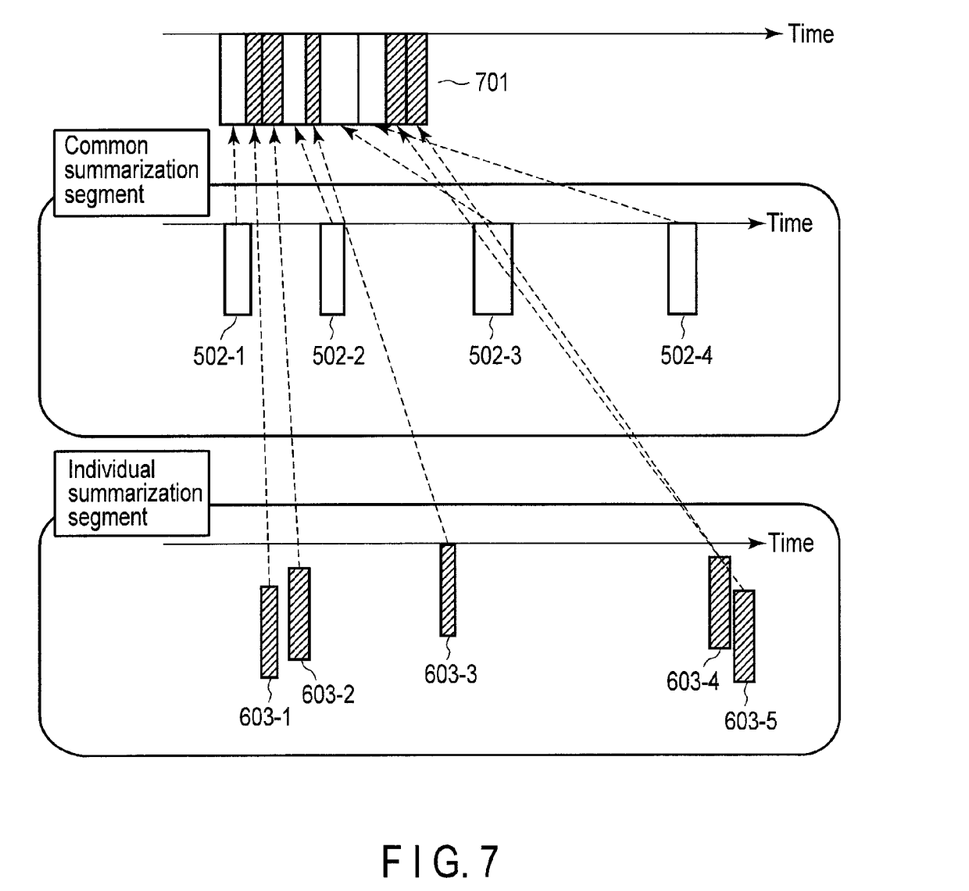
FIG. 7 illustrates an example of the method of creating a summary video.

In FIG. 7, the common summarization segments and the individual summarization segments respectively extracted from the common summarization segment selection module 106 and the individual summarization segment selection module 110 are integrated in accordance with time order to create the summary video. Concretely, the common summarization segment 502-1 captured first is selected, the individual summarization segment 603-1 captured by user A second is selected, and the individual summarization segment 603-2 captured by user B third is then selected. The summarization segments are selected in this manner and integrated to create a summary video 701. In FIG. 7, the summarization segments are integrated in accordance with time order; however, the common summarization segments 502 may be integrated prior to integrating the individual summarization segments 603. This expands variation of the summary video 701.

In accordance with the first embodiment, when creating a summary video from multiple video streams, segments are associated with each other based on the feature values of video streams, and the common summarization segments that are important scenes and the individual summarization segments different from the important scenes are selected to create the summary video. Such a summary video includes not only the important scenes, but also personal scenes. This increases the variety of the summary video and improves the quality of the summary video.

Second Embodiment

The second embodiment is different from the first embodiment in that a video segment corresponding to a typical pattern is included in a summary video. The typical pattern indicates a combination of video segments constituting a predetermined video sequence. Including the typical pattern in the summary video can improve the quality of summary video.

Figure 8:
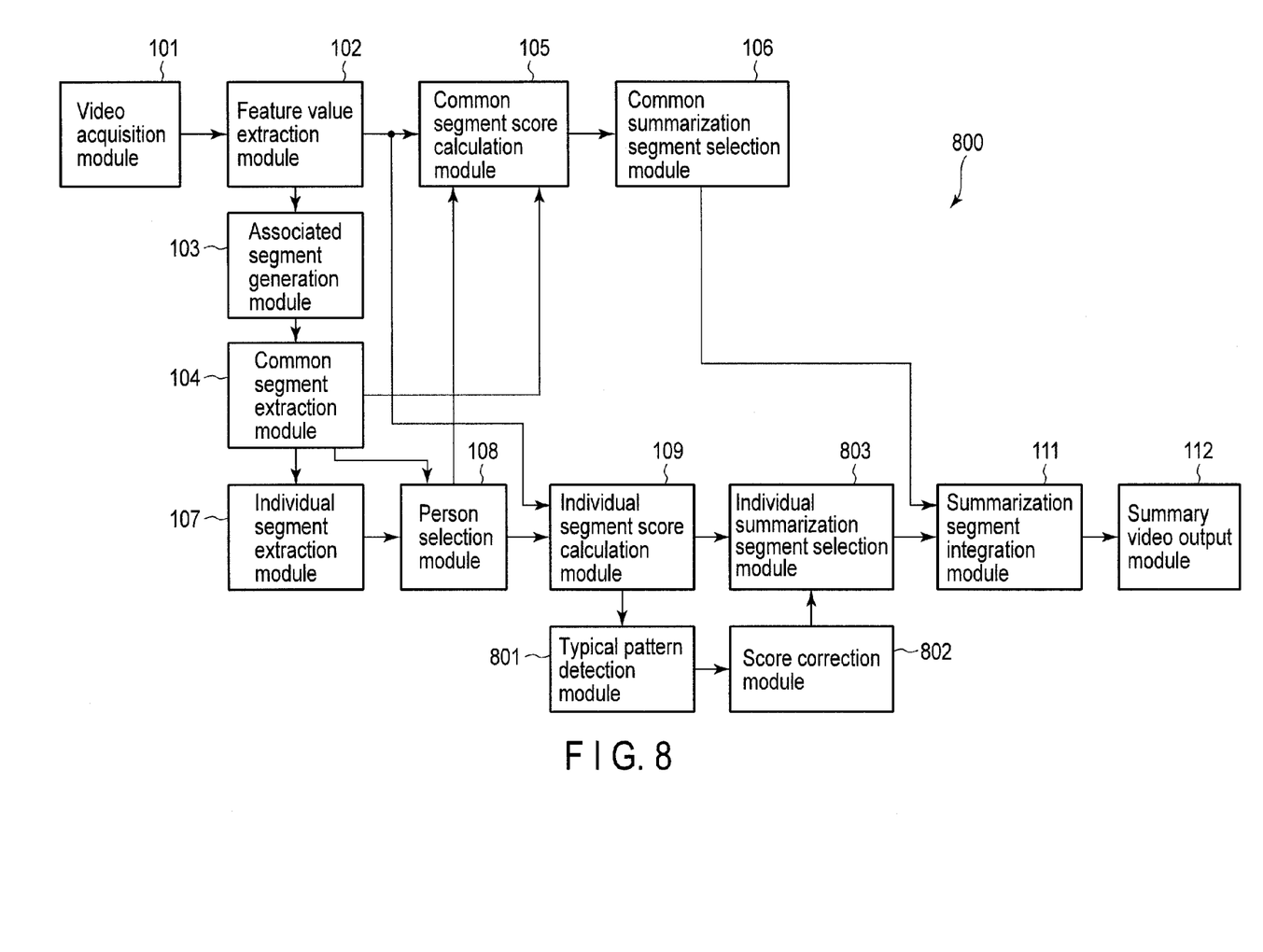
FIG. 8 is a block diagram illustrating a video processing apparatus according to the second embodiment.

The video processing apparatus according to the second embodiment will be explained with reference to the block diagram shown in FIG. 8.

A video processing apparatus 800 according to the second embodiment includes a video acquisition module 101, a feature value extraction module 102, an associated segment generation module 103, a common segment extraction module 104, a common segment score calculation module 105, a common summarization segment selection module 106, an individual segment extraction module 107, a person selection module 108, an individual segment score calculation module 109, a summarization segment integration module 111, a summary video output module 112, a typical pattern detection module 801, a score correction module 802 and an individual summarization segment selection module 803.

The video acquisition module 101, feature value extraction module 102, associated segment generation module 103, common segment extraction module 104, common segment score calculation module 105, common summarization segment selection module 106, individual segment extraction module 107, person selection module 108, individual segment score calculation module 109, summarization segment integration module 111 and summary video output module 112 perform the same operation as in the first embodiment, and the explanations thereof will be omitted.

The typical pattern detection module 801 receives a feature value of an individual video segment from the individual segment score calculation module 109, and receives a feature value model of the typical pattern from a typical pattern dictionary. The typical pattern detection module 801 compares the feature values of individual video segments with the feature value model of the typical pattern and calculates a similarity. The feature value model is prepared by modeling the feature values of videos and indicates sequential change of feature values. The typical pattern dictionary may be pre-stored in the typical pattern detection module 801 or stored in an external module.

The score correction module 802 receives an individual video segment and the similarity corresponding to the individual video segment from the typical pattern detection module 801, and calculates a corrected summarization score by adding a correction value to the summarization score of an individual video segment whose similarity is greater than or equal to a threshold value. Concretely, the correction value may be set to be higher than a threshold value set in the individual summarization segment selection module 110 that is a post-processing format so that the individual summarization segment selection module 110 selects the segment as an individual summarization segment.

The individual summarization segment selection module 803 performs substantially the same operation as in the first embodiment. The individual summarization segment selection module 803 receives the summarization score or the corrected summarization score from the score correction module 802, and selects an individual summarization segment based on the received scores.

The specific examples of the typical pattern will be explained.

An event in which multiple videos are captured includes a wedding ceremony, school play, stage performance, theater, dance party, school sports day, live musical performance, seminar, lecture, sporting event, fireworks, or party, for example.

Scenes and objects that may be included in an individual summarization segment in a wedding ceremony may be a scene of the neighborhood of the ceremony hall, conversation of friends waiting at the reception, dishes, friends at table, people in the hall when the bride and groom enter to or exit from the hall, and a scene selected as a common summarization segment (for example, a friend's performance). For a school play, scenes and objects that may be included in an individual summarization segment may be a scene of the neighborhood of the school hall, a scene before and after a program, a scene of people in the hall during the intermission, and a close-up scene of a family member, friends or a certain performer.

For a school sports day, scenes and objects that may be included in an individual summarization segment may be a scene of the entrance or school building, a scene of audience, family, friends, teachers, lunch box, or scoreboard, or a close-up scene of a certain person. For a live music performance, scenes and objects that may be included in an individual summarization segment may be a scene of the hall during of between performances, or a scene of the intermission. For a seminar, scenes and objects that may be included in an individual summarization segment may be a scene between lectures, a scene of the hall, or a scene of the intermission. For fireworks, scenes and objects that may be included in an individual summarization segment may be a scene of the place where fireworks take place, a scene of friends, family, food, or scenery. For a party, scenes and objects that may be included in an individual summarization segment may be scenes of a hall, presents, food, friends or family.

If a user wishes to set food as a typical pattern, colors of plates or an edge feature value may be set as a parameter of the feature value model of the typical pattern. If a user wishes to set a scene inside the building as a typical pattern, the composition or an edge feature value may be set as a parameter of the feature value model of the typical pattern. A recognition technique may be used instead of the typical pattern dictionary.

According to the second embodiment, the feature values of the individual video segments and the similarities between the individual video segments and the feature value model of the typical pattern are compared, and a segment having the similarity greater than or equal to a threshold value is included in the summary video. This realizes creation of the summary video following the typical pattern that professionals would use, and improve the quality of the summary video.

In the above embodiments, the processing is explained with reference to video streams, but it is also applicable to still pictures. For still pictures taken at very short intervals, for example one to dozens or more of pictures per second, the same processing as for movies extracted frame-by-frame can be executed by using image features. For pictures taken at general intervals, the same processing can be performed associated pictures by clustering the pictures according to time order and calculating similarities between pictures based on image features.

The flowcharts of the embodiments illustrate methods and systems according to the embodiments. It will be understood that each block of the flowchart illustrations, and combinations of blocks in the flowchart illustrations, can be implemented by computer program instructions. These computer program instructions may be loaded into a computer or other programmable apparatus to produce a machine, such that the instructions which execute on the computer or other programmable apparatus create means for implementing the functions specified in the flowchart block or blocks. These computer program instructions may also be stored in a computer-readable memory that can direct a computer or other programmable apparatus to function in a particular manner, such that the instruction stored in the computer-readable memory produce an article of manufacture including instruction means which implement the function specified in the flowchart block or blocks. The computer program instructions may also be loaded into a computer or other programmable apparatus to cause a series of operational steps to be performed on the computer or other programmable apparatus to produce a computer programmable apparatus which provides steps for implementing the functions specified in the flowchart block or blocks.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A video processing method performed by a processor, comprising:
  acquiring a plurality of video streams each including moving picture data item and sound data item;
  extracting one or more feature values indicating a common feature between the video streams and changing in time series, by analyzing at least one of the moving picture data item and the sound data item for each video stream;
  generating a plurality of segments by dividing each of the video streams in accordance with changes in the one or more feature values, and generating associated segment groups by comparing the first feature values for each of the segments to obtain similarities and associating a plurality of segments in different video streams such that the plurality of segments included in each of the associated segment groups have a similarity not less than a first threshold value;
  extracting from the associated segment groups, one or more common video segments in which the number of segments included therein is not less than a second threshold value;
  calculating a first summarization score indicating a degree of suitability for including the one or more common video segments in a summary video, the first summarization score being defined for each common video segment and varying with time and being based on the one or more feature values;
  selecting a common summarization segment to be used for the summary video from the one or more common video segments based on the first summarization score;
  extracting from the associated segment groups, one or more individual video segments in which the number of segments included therein is not more than a third threshold value that is less than the second threshold value;
  calculating a second summarization score indicating a degree of suitability for including the one or more individual video segments in the summary video, the second summarization score being defined for each of the one or more individual video segments and varying with time and being based on the one or more feature values;
  selecting an individual summarization segment to be used for the summary video from the one or more individual video segments based on the second summarization score; and
  integrating the common summarization segment and the individual summarization segment to create the summary video.

2. The method according to claim 1, wherein the calculating the second summarization score calculates a first difference between second feature values of the one or more common video segments and third feature values of the one or more individual video segments, and weights the second summarization score of the one or more individual video segments to be higher as the first difference becomes larger.

3. The method according to claim 1, wherein the calculating the second summarization score calculates a second difference between the feature values of the one or more individual video segments, and weights the second summarization score of the one or more individual video segments to be higher as the second difference becomes larger.

4. The method according to claim 1, wherein the calculating the second summarization score weights the second summarization score of the one or more individual video segments to be higher as the number of segments associated with the one or more individual video segments becomes smaller.

5. The method according to claim 1, further comprising:
  calculating similarities between a feature value model of a typical pattern and the feature values of the one or more individual video segments so as to detect a first individual video segment having a similarity not less than a fourth threshold value, the typical pattern indicating a combination of video segments constituting a predetermined video sequence; and
  adding a correction value to the second summarization score of the first individual video segment to generate a corrected summarization score,
  wherein the selecting the individual summarization segment selects the individual summarization segment based on the second summarization score and the corrected summarization score.

6. The method according to claim 1, further comprising selecting a summarization object that is to be a main object of the summary video in each of the one or more common video segments and individual video segments, wherein the calculating the second summarization score weights the second summarization score of the one or more individual video segments which includes the summarization object to be high.

7. A non-transitory computer readable medium including computer executable instructions, wherein the instructions, when executed by a processor, cause the processor to perform a method comprising:
  acquiring a plurality of video streams each including moving picture data item and sound data item;
  extracting one or more feature values indicating a common feature between the video streams and changing in time series, by analyzing at least one of the moving picture data item and the sound data item for each video stream;
  generating a plurality of segments by dividing each of the video streams in accordance with changes in the one or more feature values, and generating associated segment groups by comparing the first feature values for each of the segments to obtain similarities and associating a plurality of segments in different video streams such that the plurality of segments included in each of the associated segment groups have a similarity not less than a first threshold value;

extracting, from the associated segment groups, one or more common video segments in which the number of segments included therein is not less than a second threshold value;

calculating a first summarization score indicating a degree of suitability for including the one or more common video segments in a summary video, the first summarization score being defined for each common video segment and varying with time and being based on the one or more feature values;

selecting a common summarization segment to be used for the summary video from the one or more common video segments based on the first summarization score;

extracting, from the associated segment groups, one or more individual video segments in which the number of segments included therein is not more than a third threshold value that is less than the second threshold value;

calculating a second summarization score indicating a degree of suitability for including the one or more individual video segments in the summary video, the second summarization score being defined for each of the one or more individual video segments and varying with time and being based on the one or more feature values;

selecting an individual summarization segment to be used for the summary video from the one or more individual video segments based on the second summarization score; and integrating the common summarization segment and the individual summarization segment to create the summary video.

8. The medium according to claim 7, wherein the calculating the second summarization score calculates a first difference between second feature values of the one or more common video segments and third feature values of the one or more individual video segments, and weights the second summarization score of the one or more individual video segments to be higher as the first difference becomes larger.

9. The medium according to claim 7, wherein the calculating the second summarization score calculates a second difference between the feature values of the one or more individual video segments, and weights the second summarization score of the one or more individual video segments to be higher as the second difference becomes larger.

10. The medium according to claim 7, wherein the calculating the second summarization score weights the second summarization score of the individual video segment to be higher as the number of segments associated with the one or more individual video segments becomes smaller.

11. The medium according to claim 7, further comprising:
calculating similarities between a feature value model of a typical pattern and the feature values of the one or more individual video segments so as to detect a first individual video segment having a similarity not less than a fourth threshold value, the typical pattern indicating a combination of video segments constituting a predetermined video sequence; and adding a correction value to the second summarization score of the first individual video segment to generate a corrected summarization score, wherein the selecting the individual summarization segment selects the individual summarization segment based on the second summarization score and the corrected summarization score.

12. The medium according to claim 7, further comprising selecting a summarization object that is to be a main object of the summary video in each of the one or more common video segments and individual video segments, wherein the calculating the second summarization score weights the second summarization score of the one or more individual video segments which includes the summarization object to be high.

13. An image processing apparatus, comprising:
an acquisition module configured to acquire one or more still picture groups each including a plurality of still pictures;

a first extraction module configured to extract one or more feature values indicating a common feature between the one or more still picture groups, by analyzing the one or more still picture groups;

a generation module configured to generate a plurality of associated still picture groups by comparing the feature values for each of the still pictures to obtain similarities and associating a plurality of still pictures such that the plurality of still pictures included in each of the associated still picture groups have a similarity not less than a first threshold value;

a second extraction module configured to extract, from the associated still picture groups, common still picture groups in which the number of still pictures included therein is not less than a second threshold value;

a first calculation module configured to calculate a first summarization score indicating a degree of suitability for each still picture of the common still picture groups in a summary still picture, the first summarization score being defined for each common still picture group and varying with time and being based on the one or more feature values;

a first selection module configured to select still pictures to be used for the summary still picture as common summarization still pictures from the common still picture groups based on the first summarization score;

a third extraction module configured to extract, from the associated still picture groups, individual still picture groups in which the number of still pictures included therein is not less than a third threshold value that is less than the second threshold value;

a second calculation module configured to calculate a second summarization score indicating a degree of suitability for each still picture of the individual still picture groups in the summary still picture, the second summarization score being defined for each individual still picture group and varying with time and being based on the one or more feature values;

a second selection module configured to select still pictures to be used for the summary still picture as individual summarization still pictures from the individual still picture groups based on the second summarization score; and an integration module configured to integrate the common summarization still pictures and the individual summarization still pictures to create the summary still picture.

14. The apparatus according to claim 13, wherein the second calculation module calculates a first difference between first feature values of the common still picture groups and second feature values of the individual still picture groups, and weights the second summarization score of the individual still picture groups to be higher as the first difference becomes larger.

15. The apparatus according to claim 13, wherein the second calculation module calculates a second difference between the feature values of the individual still picture groups, and weights the second summarization score of the individual still picture groups to be higher as the second difference becomes larger.

16. The apparatus according to claim 13, wherein the second calculation module weights the second summarization score of the individual still picture groups to be higher as the number of still pictures associated with for the individual still picture groups becomes smaller.

17. The apparatus according to claim 13, further comprising:
- a detection module configured to calculate similarities between a feature value model of a typical pattern and the feature values of the individual still picture groups, and to detect a first individual still picture group having a similarity not less than a fourth threshold value, the typical pattern indicating a combination of still pictures constituting a predetermined video sequence; and
- a correction module configured to add a correction value to the second summarization score of the first individual still picture group to generate a corrected summarization score,
- wherein the second selection module selects the individual summarization still pictures based on the second summarization score and the corrected summarization score.

18. The apparatus according to claim 13, further comprising a third selection module configure to select a summarization object that is to be a main object of the summary still picture in each of the common still picture groups and individual still picture groups, wherein the second calculation module weights the second summarization score of the individual still picture group including the summarization object to be high.

* * * * *

UNITED STATES PATENT AND TRADEMARK OFFICE
CERTIFICATE OF CORRECTION

| | | |
|---|---|---|
| PATENT NO. | : 8,873,861 B2 | Page 1 of 1 |
| APPLICATION NO. | : 13/705399 | |
| DATED | : October 28, 2014 | |
| INVENTOR(S) | : Motoi et al. | |

It is certified that error appears in the above-identified patent and that said Letters Patent is hereby corrected as shown below:

In the Claims

Claim 16, column 15, line 7, change "with for the" to --with the--.

Signed and Sealed this
Third Day of March, 2015

Michelle K. Lee
*Deputy Director of the United States Patent and Trademark Office*